(12) United States Patent
Yamamoto

(10) Patent No.: US 12,358,130 B2
(45) Date of Patent: Jul. 15, 2025

(54) MACHINE LEARNING DEVICE AND ROBOT SYSTEM

(71) Applicant: DENSO WAVE INCORPORATED, Aichi-Pref. (JP)

(72) Inventor: Yosuke Yamamoto, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 321 days.

(21) Appl. No.: 17/717,843

(22) Filed: Apr. 11, 2022

(65) Prior Publication Data

US 2022/0324103 A1 Oct. 13, 2022

(30) Foreign Application Priority Data

Apr. 13, 2021 (JP) ................................ 2021-067894

(51) Int. Cl.
*B25J 9/16* (2006.01)
*B25J 13/08* (2006.01)
*B25J 15/02* (2006.01)

(52) U.S. Cl.
CPC ............. *B25J 9/1612* (2013.01); *B25J 9/161* (2013.01); *B25J 9/163* (2013.01); *B25J 9/1633* (2013.01); *B25J 13/082* (2013.01); *B25J 13/085* (2013.01); *B25J 15/0253* (2013.01); *G05B 2219/39505* (2013.01); *G05B 2219/40499* (2013.01)

(58) Field of Classification Search
CPC . B25J 9/1612; B25J 9/161; B25J 9/163; B25J 9/1633; B25J 13/082; B25J 13/085; B25J 15/0253; G05B 2219/39505; G05B 2219/40499
See application file for complete search history.

(56) References Cited

U.S. PATENT DOCUMENTS

| | | | |
|---|---|---|---|
| 7,706,918 B2* | 4/2010 | Sato | B25J 9/1612 318/568.1 |
| 9,561,590 B1* | 2/2017 | Nusser | B25J 9/1661 |
| 9,827,670 B1* | 11/2017 | Strauss | B25J 9/0009 |
| 11,571,809 B1* | 2/2023 | Bodnar | B25J 9/1612 |
| 11,772,833 B1* | 10/2023 | Shi | B65B 5/08 700/259 |
| 11,970,343 B1* | 4/2024 | Terhuja | B25J 9/1679 |
| 2007/0239315 A1* | 10/2007 | Sato | B25J 9/1612 700/245 |

(Continued)

*Primary Examiner* — Sohana Tanju Khayer
(74) *Attorney, Agent, or Firm* — Oliff PLC

(57) ABSTRACT

In a robot (industrial robot) system, a robot holds a workpiece by pinching the workpiece between movable claws. A controller, which controls the robot, includes a host controller that controls the robot to perform a positioning operation for positioning the hand to a grip position and a gripping operation for displacing each of the movable claws toward each other at the grip position. In the controller, a machine learning device acquires stop reference data set for gripping of the workpiece, distance data indicating a distance between each of the movable claws of the hand positioned at the grip position and the workpiece, and comparison data indicating a deformation amount of the workpiece before and after the gripping operation. The machine learning device performs machine learning using such acquired data, resulting in constructing a model used for setting an operation mode of the gripping operation.

17 Claims, 9 Drawing Sheets

(56) References Cited

U.S. PATENT DOCUMENTS

| | | | |
|---|---|---|---|
| 2013/0006423 A1* | 1/2013 | Ito | B25J 9/1612 |
| | | | 901/46 |
| 2014/0028118 A1 | 1/2014 | Sakano | |
| 2015/0105907 A1* | 4/2015 | Aiso | B25J 9/1633 |
| | | | 901/47 |
| 2017/0252924 A1* | 9/2017 | Vijayanarasimhan | |
| | | | G05B 13/027 |
| 2017/0291806 A1* | 10/2017 | Lessing | B65C 3/26 |
| 2018/0281201 A1* | 10/2018 | Rosenstein | B25J 15/12 |
| 2019/0030714 A1* | 1/2019 | Knopf | F15B 15/10 |
| 2019/0047156 A1* | 2/2019 | Curhan | B25J 15/12 |
| 2019/0111571 A1* | 4/2019 | Curhan | B25J 15/0023 |
| 2019/0152054 A1* | 5/2019 | Ishikawa | B25J 9/163 |
| 2019/0152055 A1 | 5/2019 | Abe | |
| 2019/0329409 A1* | 10/2019 | Yamada | B25J 9/1661 |
| 2019/0381670 A1* | 12/2019 | Correll | B25J 15/10 |
| 2020/0061811 A1* | 2/2020 | Iqbal | G06N 3/08 |
| 2020/0189102 A1* | 6/2020 | Sasajima | B25J 9/1641 |
| 2020/0368901 A1* | 11/2020 | Takahashi | B25J 9/163 |
| 2021/0129319 A1* | 5/2021 | Kaneko | B25J 9/161 |
| 2021/0283771 A1* | 9/2021 | Ijiri | B25J 9/1635 |
| 2021/0291366 A1* | 9/2021 | Eto | B25J 9/1664 |
| 2021/0331316 A1* | 10/2021 | Bhat | B25J 9/1661 |
| 2021/0387331 A1* | 12/2021 | Wong | B25J 15/103 |
| 2021/0387336 A1* | 12/2021 | Fukusen | B25J 9/163 |
| 2022/0016765 A1* | 1/2022 | Ku | G05B 19/4155 |
| 2022/0072707 A1* | 3/2022 | Fan | G06T 7/73 |
| 2022/0134550 A1* | 5/2022 | Isobe | B25J 9/1697 |
| | | | 700/259 |
| 2022/0270198 A1* | 8/2022 | Han | H04N 23/90 |
| 2022/0274252 A1* | 9/2022 | Komoda | B25J 15/0052 |
| 2022/0297297 A1* | 9/2022 | Huang | B25J 13/085 |
| 2022/0297312 A1* | 9/2022 | Baek | B25J 15/0052 |
| 2022/0355490 A1* | 11/2022 | Matsuda | B25J 13/082 |
| 2023/0109294 A1* | 4/2023 | Kim | B25J 13/06 |
| | | | 700/253 |
| 2023/0125022 A1* | 4/2023 | Li | B25J 9/1656 |
| | | | 700/245 |
| 2023/0150777 A1* | 5/2023 | Skyum | B07C 5/02 |
| | | | 700/245 |
| 2023/0278198 A1* | 9/2023 | Wang | B25J 9/163 |
| | | | 700/259 |
| 2023/0306713 A1* | 9/2023 | Tsuda | G06V 10/761 |
| 2023/0311323 A1* | 10/2023 | Szabó | B25J 9/1671 |
| | | | 700/246 |
| 2024/0054393 A1* | 2/2024 | Tanaka | G05B 13/0265 |

\* cited by examiner

FIG.5

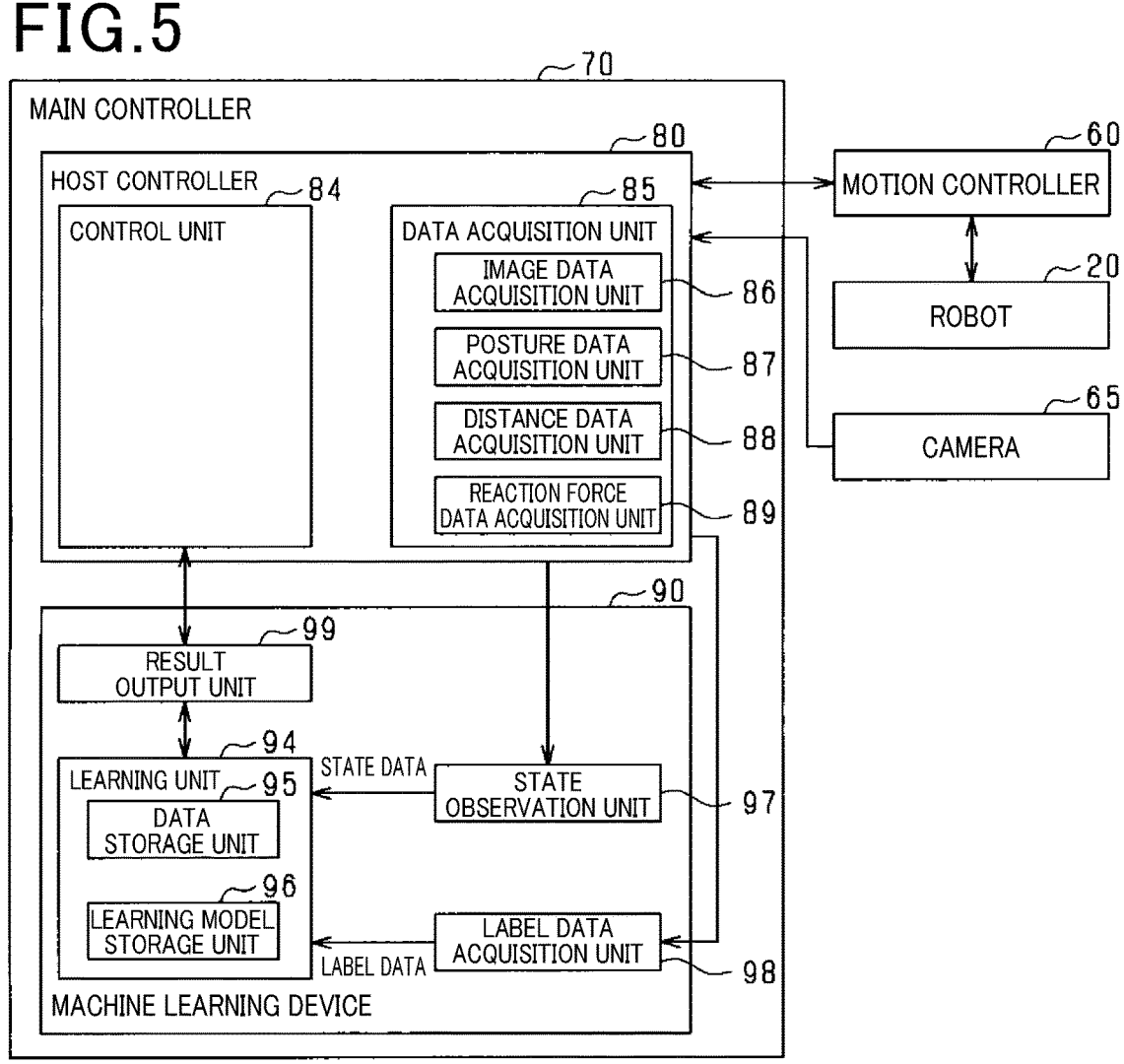

FIG.6

| CATEGORY | TYPE | DESCRIPTION |
|---|---|---|
| STATE DATA | WORKPIECE POSITION DATA | POSITION OF WORKPIECE IN PREDETERMINED AREA |
| | POSTURE DATA | POSTURE OF ROBOT WHEN GRIPPING WORKPIECE |
| | SHAPE DATA | SHAPE OF WORKPIECE BEFORE GRIPPING OPERATION |
| | TYPE DATA | TYPE OF WORKPIECE (CREAM PUFF, ECLAIR, etc.) |
| | COMPARISON DATA | DEFORMATION AMOUNT (DAMAGE) OF WORKPIECE BEFORE AND AFTER GRIPPING |
| LABEL DATA | STOP REFERENCE DATA | REFERENCE REACTION FORCE WHICH TRIGGERS STOP OF MOTOR (OR REFERENCE RELATIVE DISTANCE BETWEEN MOVABLE CLAWS) |
| | DISTANCE DATA | DISTANCE BETWEEN WORKPIECE AND MOVABLE CLAWS AT GRIP POSITION |

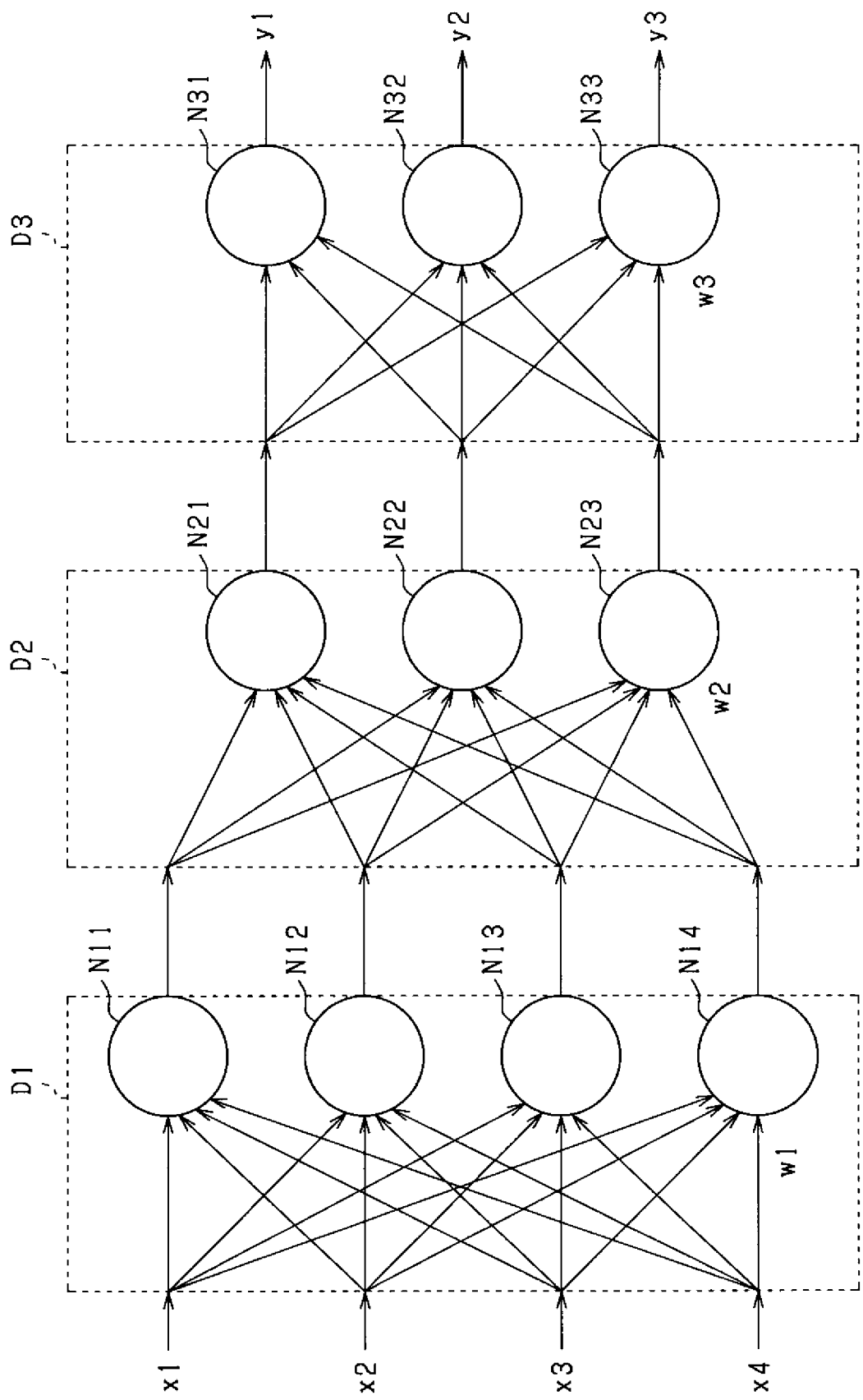

MACHINE LEARNING DEVICE AND ROBOT SYSTEM

CROSS-REFERENCE TO RELATED APPLICATION

This application is based on and claims the benefit of priority from earlier Japanese Patent Application No. 2021-067894 filed Apr. 13, 2021, the description of which is incorporated herein by reference.

BACKGROUND

Technical Field

The present invention relates to a machine learning device and a robot system.

Background Art

There are robot systems configured to hold an object (workpiece) by gripping the object with a pair of movable claws (grip unit) provided on the distal end of the robot arm. For example, JP 2014-24134 A discloses this type of robot system, which is configured to detect a change in the current value of a motor for a movable claw, a reaction force from the object, or the like, and stop the movable claw when the detected value reaches a predetermined reference value.

[Patent reference 1] JP-2014-24134 A

Technical Problem

When food products such as cream puffs, daifuku (soft rice cake stuffed with sweet bean paste), bread and the like are assumed as objects, the variability in shape of the object is large (irregular shape) and a reaction force from the gripped object is small (low reaction force) compared with a case where industrial products made of metal or synthetic resin are used as objects. When a pair of movable claws pinches an object to grip the object as described above, one of the movable claws may come into contact with the object before the other of the movable claws does. In this case, a pressure applied to the object may become locally high, or the object pushed by one of the movable claws may slide on a placement surface where the object is placed. In particular, since the shape of objects such as cream puffs varies greatly, a difference in distance between each of the movable claws and the object is likely to occur when the grip unit is positioned according to the position of the object specified from an image or the like. Such a difference causes a difference in timing at which each of the movable claws comes into contact with the object.

Further, soft objects such as cream puffs are likely to be subjected to damage (including excessive deformation) when they are pushed by a movable claw and slide on the placement surface while being deformed. Such damage to the object may be a factor that reduces the yield in production process or the like, and may hinder efforts to improve the production efficiency by application of the robot system. As described above, there is still room for improvement in the configuration of the robot system in order to appropriately grip an object having a low reaction force and an irregular shape.

SUMMARY

It is thus desired to provide a robot system capable of appropriately gripping an object having a low reaction force and an irregular shape.

Solution to Problem

The solution to the above problems will be described below.

First Configuration:

A robot system including:

a robot (robot 20) having a grip unit (hand 38) composed of a pair of movable claws (movable claws 38a and 38b), the robot being configured to hold an object (workpiece W) by pinching the object with the movable claws; and a controller (controller 70) that controls the robot to perform a positioning operation for positioning the grip unit to a predetermined position (grip position) in which the object is located between the pair of movable claws and a gripping operation for displacing each of the movable claws toward each other at the predetermined position, the controller being configured to stop the displacement of the pair of movable claws when a reaction force from the object becomes a reference value during the gripping operation or when a relative distance between each of the pair of movable claws becomes a reference value, wherein the robot system is capable of performing an adjustment operation for adjusting positions of the pair of movable claws relative to the object by displacing the grip unit in a situation where the grip unit is positioned in the predetermined position, the reference value for stopping the gripping operation is a variable value, the robot system includes a model construction unit (machine learning device 90) that acquires stop reference data indicating the reference value set for gripping of the object, distance data indicating a distance between each of the movable claws of the grip unit positioned at the predetermined position and the object, and comparison data indicating a difference between a state of the object before the gripping operation is performed and a state of the object after the gripping operation is performed (for example, deformation amount of the workpiece W), and performs machine learning using the stop reference data, the distance data and the comparison data to construct a model (operation setting model) used for setting an operation mode of a predetermined operation including the adjustment operation and the gripping operation, and the controller includes:

an acquisition unit (data acquisition unit 85) that acquires the distance data indicating a distance between the object and each of the movable claws of the grip unit when the grip unit is positioned at the predetermined position; and a setting unit (control unit 84) that sets an operation mode of the predetermined operation of the robot, the setting unit being capable of setting the operation mode of the predetermined operation based on the distance data acquired by the acquisition unit and the model constructed by the model construction unit.

In a configuration in which an object (cream puff, daifuku, bread, etc.) is gripped with a pair of movable claws, a difference in distance between each of the movable claws and the object may occur when the grip unit is positioned with the object being located between the movable claws. The difference is obvious when the object has a large variation in shape (object having an irregular shape). Further, such a difference causes a difference in timing at which each of the movable claws comes into contact with the object. When the object is soft, that is, when the reaction force is small, there is a concern that there is a high possibility that the object is damaged due to such timing difference. According to the present configuration, machine learning using the stop reference data, the distance data and the comparison data is performed to construct a model used for setting an operation mode of a predetermined operation including the adjustment operation and the gripping operation. With this configuration, it is possible not only to set an appropriate reference value, but also to appropriately adjust the position of the movable claws according to the positioning situation of the grip unit. That is, it is possible to prevent the object from being damaged due to be above-mentioned timing difference, contributing to realization of a robot system capable of appropriately gripping the object having a low reaction force and an irregular shape. In addition, damage to the object may occur not only due to the above-mentioned timing difference, but also when the setting of the reference value is inappropriate. However, it seems to be difficult to specify the cause of damage from the comparison data. Therefore, using the stop reference data, the distance data and the comparison data as input data for machine learning can contribute to optimization of the predetermined operation (adjustment operation, gripping operation).

The "comparison data" is not specifically limited as long as it can specify the degree of damage to the object, and may be, for example, data indicating a change in shape or data indicating a change in weight.

Further, the "operation mode of the predetermined operation" described in this configuration includes setting of whether the adjustment operation can be performed and setting of the displacement amount of the movable claws during adjustment operation.

Second Configuration:

The model construction unit acquires, as the comparison data, data indicating a difference between a shape of the object before the gripping operation is performed and a shape of the object after the gripping operation is performed.

When the object having a low reaction force is damaged, a change in weight or a change in shape occurs. Since a change in weight mostly occurs along with a change in shape, the degree of damage to the object can be appropriately reflected in machine learning by comparing the shape of the object.

Third Configuration

The model construction unit acquires shape data indicating a shape of the object before the gripping operation is performed and direction data indicating a relationship between a reference direction (for example, a direction connecting two points whose distance therebetween is largest on the image of the object: longitudinal direction) of the object and a direction in which the pair of movable claws pinch the object, and performs the machine learning by associating the stop reference data, the distance data, the comparison data, the shape data and the direction data.

When an object having a low reaction force and an irregular shape is gripped, there is a possibility that the difference in timing and the influence of the load may vary depending on the direction in which the object is gripped. In other words, the positional relationship or the like which does not require adjustment between the object and each of the movable claws may vary depending on the pinching direction. Therefore, as shown in this configuration, machine learning performed while adding the shape data and the direction data to the various data described in the first configuration or the like can further optimize the effects described in the first configuration.

Fourth Configuration:

A portion of the pair of movable claws which comes into contact with the object has a flat surface, and the model construction unit acquires shape data indicating a shape of the object before the gripping operation is performed and contact area data indicating a contact area between the object and the pair of movable claws when gripping the object, and performs the machine learning by associating the stop reference data, the distance data, the comparison data, the shape data and the contact area data.

When an object having a low reaction force and an irregular shape is gripped, the influence on the object may vary depending on the contact area. In other words, the positional relationship or the like which does not require adjustment between the object and each of the movable claws may vary depending on the contact area. Therefore, as shown in this configuration, machine learning performed while adding the speed data and the contact area data to the various data described in the first configuration or the like can further optimize the effects described in the first configuration.

Fifth Configuration:

The controller is configured to displace the pair of movable claws at a set speed when the gripping operation is performed, the speed is a variable value, and the model construction unit acquires speed data indicating a displacement speed when each of the movable claws are displaced toward the object, and performs the machine learning by associating the stop reference data, the distance data, the comparison data and the speed data.

When the above-mentioned difference in timing occurs, the influence on the object may vary depending on the displacement speed of the movable claws. In other words, the positional relationship or the like which does not require adjustment between the object and each of the movable claws may vary depending on the displacement speed. Therefore, as shown in this configuration, machine learning performed while adding the speed data to the various data described in the first configuration or the like can further optimize the effects described in the first configuration.

Sixth Configuration:

The model construction unit acquires position data indicating a position of the object before the gripping operation is performed, and performs the machine learning by associating the stop reference data, the distance data, the comparison data and the position data.

In order to improve the convenience of the robot system, a certain allowable range for the position of the supplied object can be provided. When such a range is provided, how each of the movable claws comes into contact with the object when gripping the object may differ from each other depending on the position in the range to which the object is supplied. Therefore, as shown in this configuration, machine learning performed while adding the position data to the various data described in the first configuration or the like can further optimize the effects described in the first configuration.

Seventh Configuration:

The model construction unit acquires posture data indicating a posture of the robot when gripping the object, and performs the machine learning by associating the stop reference data, the distance data, the comparison data and the posture data.

How each of the movable claws comes into contact with the object may differ from each other depending on the posture of the robot when gripping the object. Therefore, as shown in this configuration, machine learning performed while adding the posture data to the various data described in the first configuration or the like can further optimize the effects described in the first configuration.

Eighth Configuration:

The model construction unit acquires environmental data indicating an environment around the robot, and performs the machine learning by associating the stop reference data, the distance data, the comparison data and the environmental data.

The hardness of the object, such as a cream puff, daifuku, or bread, having a low reaction force and an irregular shape may change according to the environmental conditions such as temperature and humidity. In other words, the positional relationship or the like which does not require adjustment between the object and each of the movable claws may vary depending on the environmental conditions. Therefore, as shown in this configuration, machine learning performed while adding the environmental data to the various data described in the first configuration or the like can further optimize the effects described in the first configuration.

Ninth Configuration:

The setting unit sets an operation mode to grip the object without adjusting relative positions between the pair of movable claws and the object when the distance data acquired by the acquisition unit is data indicating a distance within a range defined by the model, and the setting unit sets an operation mode to grip the object after adjusting relative positions between the pair of movable claws and the object when the distance data acquired by the acquisition unit is data indicating a distance out of a range defined by the model.

Determination of whether position adjustment is necessary is expected to be optimized by machine learning. This is preferred since it allows the robot system to improve object transport efficiency while reducing damage to the object.

Tenth Configuration:

A robot system including:

a robot (robot 20) having a grip unit (hand 38) composed of a pair of movable claws (movable claws 38a and 38b), the robot being configured to hold an object (workpiece W) by pinching the object with the movable claws; and a controller (controller 70) that controls the robot to perform a positioning operation for positioning the grip unit to a predetermined position (grip position) in which the object is located between the pair of movable claws and a gripping operation for displacing each of the movable claws toward each other at the predetermined position, wherein the robot system is capable of adjusting positions of the pair of movable claws relative to the object by displacing the grip unit in a situation where the grip unit is positioned in the predetermined position, the robot system includes a model construction unit (machine learning device 90) that acquires distance data indicating a distance between each of the movable claws of the grip unit positioned at the predetermined position and the object, and comparison data indicating a difference between a state of the object before the gripping operation is performed and a state of the object after the gripping operation is performed (for example, deformation amount of the workpiece W), and performs machine learning using the distance data and the comparison data to construct a model used for setting a position adjustment mode of the grip unit at the predetermined position, and the controller includes:

an acquisition unit (data acquisition unit 85) that acquires the distance data indicating a distance between the object and each of the movable claws of the grip unit when the grip unit is positioned at the predetermined position; and a setting unit that sets the position adjustment mode based on the distance data acquired by the acquisition unit and the model constructed by the model construction unit.

In a configuration in which an object (cream puff, daifuku, bread, etc.) is gripped with a pair of movable claws, a difference in distance between each of the movable claws and the object may occur when the grip unit is positioned with the object being located between the movable claws. The difference is obvious when the object has a large variation in shape (object having an irregular shape). Such a difference causes a difference in timing at which each of the movable claws comes into contact with the object. When the object is soft, that is, when the reaction force is small, there is a concern that there is a high possibility that the object is damaged due to such timing difference. According to the present configuration, machine learning using the distance data and the comparison data is performed to construct a model used for setting a position adjustment mode. With this configuration, it is possible to appropriately adjust the position of the movable claws according to the positioning situation of the grip unit. That is, it is possible to prevent the object from being damaged due to be above-mentioned timing difference, contributing to realization of a robot system capable of appropriately gripping the object having a low reaction force and an irregular shape.

Eleventh Configuration:

A machine learning device including:

a robot (robot 20) having a grip unit (hand 38) composed of a pair of movable claws (movable claws 38a and 38b), the robot being configured to hold an object (workpiece W) by pinching the object with the movable claws; and a controller (controller 70) that controls the robot to perform a positioning operation for positioning the grip unit to a predetermined position (grip position) in which the object is located between the pair of movable claws and a gripping operation for displacing each of the movable claws toward each other at the predetermined position, the controller being configured to stop the displacement of the pair of movable claws when a reaction force applied from the object becomes a reference value during the gripping operation or when a relative distance between each of the pair of movable claws becomes a reference value, and being applied to a robot system capable of performing an adjustment operation for adjusting positions of the pair of movable claws relative to the object by displacing the grip unit in a situation where the grip unit is positioned in the predetermined position, wherein the reference value for stopping the gripping operation is a variable value, and the machine learning device includes a model construction unit (machine learning device 90) that acquires stop reference data indicating the reference value set for gripping of the object, distance data indicating a distance between each of the movable claws of the grip unit positioned at the predetermined position and the object, and comparison data indicating a difference between a state of the object before the gripping operation is performed and a state of the object after the gripping operation is performed (for example, deformation amount of the workpiece W), and performs machine learning using the stop reference data, the distance data and the comparison data to construct a model used for setting an operation mode of a predetermined operation including the adjustment operation and the gripping operation.

According to the present configuration, machine learning using the stop reference data, the distance data and the comparison data is performed to construct a model used for setting an operation mode of a predetermined operation (adjustment operation, gripping operation). With this configuration, it is possible not only to set an appropriate reference value, but also to appropriately adjust the position of the movable claws according to the positioning situation of the grip unit. That is, it is possible to prevent the object from being damaged due to a difference between timings at which each of the movable claws comes into contact with the object, contributing to realization of a configuration capable of appropriately gripping the object having a low reaction force and an irregular shape. In addition, damage to the object may occur not only due to the above-mentioned timing difference, but also when the setting of the reference value is inappropriate. However, it seems to be difficult to specify the cause of damage from the comparison data. Therefore, using the stop reference data, the distance data and the comparison data as input data for machine learning can contribute to optimization of the gripping operation.

Twelfth Configuration:

A robot system including:

a robot (robot 20) having a grip unit (hand 38) composed of a pair of movable claws (movable claws 38a and 38b), the robot being configured to hold an object (workpiece W) by pinching the object with the movable claws; and a controller (controller 70) that controls the robot to perform a positioning operation for positioning the grip unit to a predetermined position (grip position) in which the object is located between the pair of movable claws and a gripping operation for displacing each of the movable claws toward each other at the predetermined position, the controller being configured to stop the displacement of the pair of movable claws when a reaction force from the object becomes a reference value during the gripping operation or when a relative distance between each of the pair of movable claws becomes a reference value, wherein the robot system is capable of adjusting a pinching direction in which the pair of movable claws are displaced by the gripping operation, the reference value for stopping the gripping operation is a variable value, the robot system includes a model construction unit (machine learning device 90) that acquires stop reference data indicating the reference value set for gripping of the object, shape data indicating a shape of the object before the gripping operation is performed, direction data indicating a relationship between a reference direction (for example, a direction connecting two points whose distance therebetween is largest on the image of the object: longitudinal direction) of the object and the pinching direction, and comparison data indicating a difference between a state of the object before the gripping operation is performed and a state of the object after the gripping operation is performed (for example, deformation amount of the workpiece W), and performs machine learning using the stop reference data, the shape data, the direction data and the comparison data to construct a model used for setting each operation mode of the positioning operation and the gripping operation, and the controller includes an acquisition unit that acquires the shape data of the object before the gripping operation is performed, and is capable of setting each operation mode of the positioning operation and the gripping operation based on the shape data acquired by the acquisition unit and the model constructed by the model construction unit.

According to the present configuration, machine learning using the stop reference data, the shape data, the direction data and the comparison data is performed to construct a model used for setting a pinching direction. With this configuration, it is possible not only to set an appropriate reference value, but also to appropriately adjust the pinching direction according to the shape of the object. That is, it is possible to prevent the object from being damaged, contributing to realization of a robot system capable of appropriately gripping the object having a low reaction force and an irregular shape. In addition, damage to the object may occur not only when the setting of the pinching direction is inappropriate, but also when the setting of the reference value is inappropriate. However, it seems to be difficult to specify the cause of damage from the comparison data. Therefore, using the stop reference data, the shape data, the direction data and the comparison data as input data for machine learning can contribute to optimization of the positioning operation and the gripping operation.

BRIEF DESCRIPTION OF DRAWINGS

In the accompanying drawings:

FIG. 5 is a functional block diagram of a main controller.

FIG. 6 is a schematic diagram showing types of input data.

FIG. 7 is a schematic diagram showing a neural network for constructing an operation setting model.

DESCRIPTION OF THE PREFERRED EMBODIMENTS

First Embodiment

With reference to the drawings, a first embodiment embodied as a robot system used in food factories or the like will be described.

Figure 1:
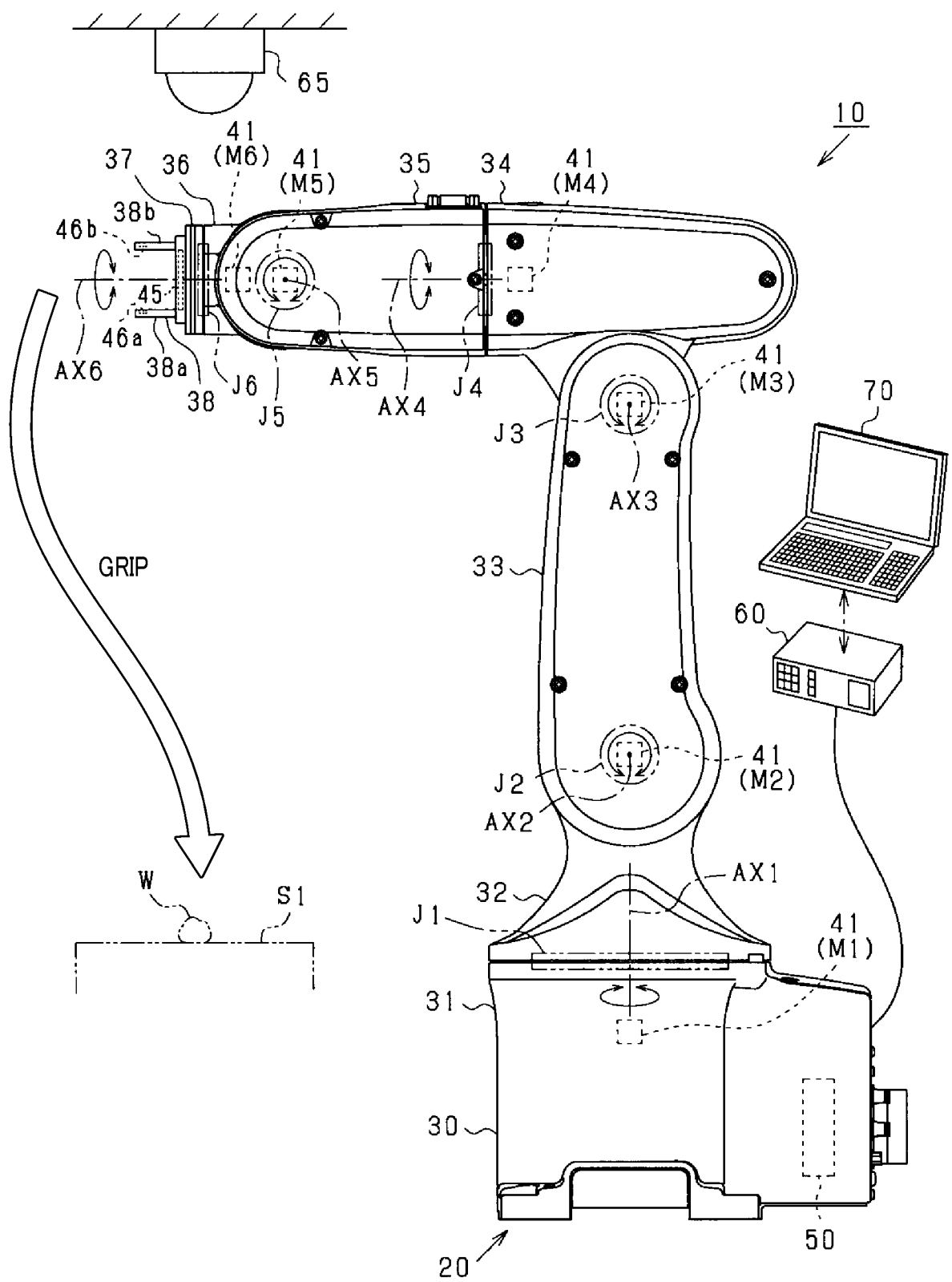
FIG. 1 is a schematic view of a robot according to a first embodiment.

As shown in FIG. 1, a robot system 10 includes a robot 20 which is a vertically articulated industrial robot, and a motion controller 60 that controls the robot 20. The robot 20 and the motion controller 60 are connected to be communicable with each other. The robot 20 is composed of a robot main body 30 and a servo amplifier 50 attached to the robot main body 30.

The robot main body 30 includes a base 31 fixed to a floor or the like, a shoulder 32 supported by the base 31, a lower arm 33 supported by the shoulder 32, a first upper arm 34 supported by the lower arm 33, a second upper arm 35 supported by the first upper arm 34, a wrist 36 supported by the second upper arm 35, and a flange 37 supported by the wrist 36.

The base 31 and the shoulder 32 has a first joint 31 via which the base 31 and the shoulder 32 are connected to each other. The shoulder 32 is rotatable in a horizontal direction about a connection axis AX1 of the first joint J1. The shoulder 32 and the lower arm 33 has a second joint 32 via which the shoulder 32 and the lower arm 33 are connected to each other. The lower arm 33 is rotatable in a vertical direction about a connection axis AX2 of the second joint 32. The lower arm 33 and the first upper arm 34 has a third joint 33 via which the lower arm 33 and the first upper arm 34 are connected to each other. The first upper arm 34 is rotatable in a vertical direction about a connection axis AX3 of the third joint 33. The first upper arm 34 and the second upper arm 35 has a fourth joint 34 via which the first upper arm 34 and the second upper arm 35 are connected to each other. The second upper arm 35 is rotatable in a twisting direction about a connection axis AX4 of the fourth joint 34. The second upper arm 35 and the wrist 36 has a fifth joint 35 via which the second upper arm 35 and the wrist 36 are connected to each other. The wrist 36 is rotatable in a vertical direction about a connection axis AX5 of the fifth joint 35. The wrist 36 and the flange 37 has a sixth joint 36 via which the wrist 36 and the flange 37 are connected to each other. The flange 37 is rotatable in a twisting direction about a connection axis AX6 of the sixth joint 36.

The shoulder 32, the lower arm 33, the first upper arm 34, the second upper arm 35, the wrist 36 and the flange 37 are arranged in this order to form an arm of the robot main body 30. A hand 38, which is an end effector, is attached to the flange 37 on the distal end of the arm. The connection axes AX1, AX4 and AX6 are parallel to the longitudinal direction of the arm, and the connection axes AX2, AX3 and AX5 are perpendicular to the longitudinal direction.

Each of the joints 31 to 36 is provided with a motor 41 (specifically, a servo motor) as a driving unit for rotating the joints 31 to 36. The motor 41 is connected to the servo amplifier 50, which controls driving of the motor 41 in response to a command received from the motion controller 60.

Figure 2:
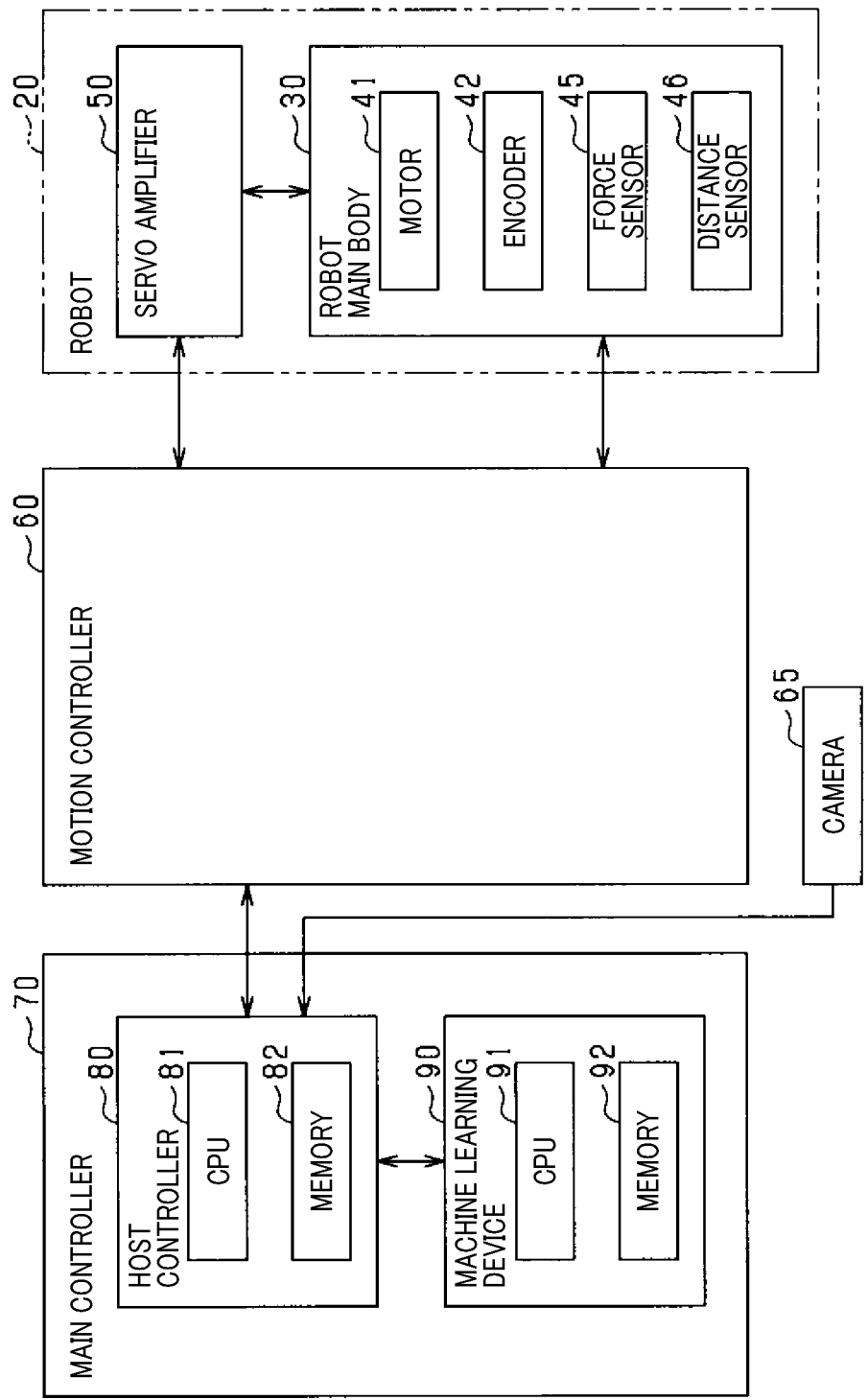
FIG. 2 is a block diagram illustrating an electric configuration of a robot system.

With reference to FIG. 2, an electric configuration of the robot system 10 will be described below. The robot system 10 includes a main controller 70 that constitutes a "controller" or a "control means" together with the motion controller 60. The main controller 70 includes a host controller 80 that transmits an operation instruction to the motion controller 60, and a machine learning device 90 that learns (machine-learns) an appropriate gripping operation or the like according to various conditions such as the shape and positioning of the workpiece W. The host controller 80 includes a CPU 81 and a memory 82 having a ROM (not shown, but serving as a non-transitory computer readable recording medium) that stores various control programs and fixed data, and a RAM capable of temporarily storing various data when the control program is executed. Similarly to the host controller 80, the machine learning device 90 includes hardware such as a CPU 91 and a memory 92. The memory 92 includes a ROM (not shown, but serving as a non-transitory computer readable recording medium for machine learning programs) that stores learning algorithms as learning software, and a RAM that stores various input data for learning.

Hence, by the processing executed by the CPU 91 (that is, a computer or a computing processor) and/or with such processing, various components 94 (95, 96), 97, 98, and 99 (shown in FIG. 5) are functionally realized.

The motion controller 60 receives an operation instruction from the host controller 80 provided in the main controller 70, reads an operation program corresponding to the operation instruction from a program storage unit, and specifies an operation target position (hereinafter, referred to as a target position or a control point) from the read operation program. Then, a target trajectory which smoothly connects the specified target position with the current position of the arm (each movable unit) of the robot 20 is generated, and interpolated positions which are subdivided positions of the target trajectory are sequentially transmitted to the servo amplifier 50.

The servo amplifier 50 includes a position control unit, a speed control unit, a current control unit and a storage unit that stored various information. The position control unit is connected to an encoder 42 attached to the motor 41. The position control unit detects a rotational position of the motor 41 (that is, a posture of the arm) based on the encoder value. The position control unit and the speed control unit calculate a target torque and a target rotational speed of each motor 41 based on the deviation between the detected rotational position and the interpolated position included in the command received from the motion controller 60. The current control unit determines electric power (current, voltage, pulse) to be supplied to each motor 41 based on the calculated target torque and target rotational speed, and supplies electric power to each motor 41.

Figure 3:
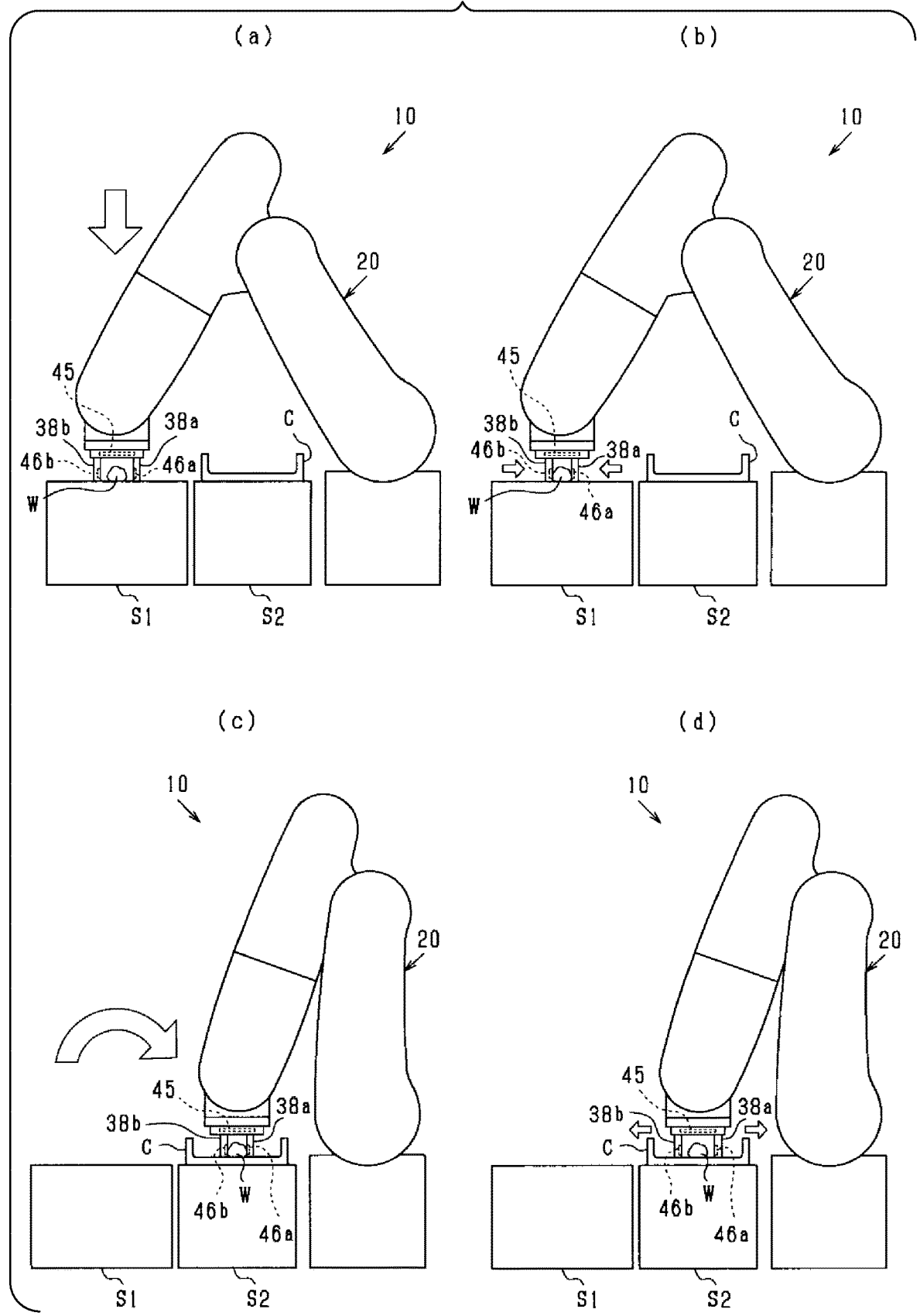
FIG. 3 is a schematic view of operation modes of a robot.

Next, with reference to FIG. 3, a basic operation of the robot 20 will be described. The robot 20 together with the conveyor S1 constitutes a part of the production line in a food factory. The conveyor S1 is configured to convey food products which have passed through the production process (processing process), specifically soft products having large variations in shape, such as cream puffs and eclairs (hereinafter, referred to as workpieces W), and the robot 20 performs packaging of these products. Specifically, a table S2, on which a case C capable of accommodating a workpiece W is disposed, is disposed adjacent to the conveyor S1. The conveyor S1 transports a workpiece W which has passed through the production process to a predetermined area in front of the robot 20. When the workpiece W is transported into the case C by the robot 20, the conveyor S1 then transports a next workpiece W to the predetermined area. In the present embodiment, the workpiece W corresponds to an "object" or an "object to be gripped."

The robot system 10 includes a camera 65 (see FIG. 1) fixed to a ceiling of the building, and an image captured by the camera 65 is transmitted to the host controller 80. When the host controller 80 identifies the workpiece W positioned in the predetermined area by image analysis, the host controller 80 changes the posture of the robot 20 to position the hand 38 at a grip position (corresponding to a "predetermined position") where the workpiece W can be gripped. Due to the hand 38 being positioned at the grip position, the workpiece W comes to a position between the movable claws 38a and 38b of the hand 38 (see FIG. 3(a)).

As shown in FIG. 3(a) to FIG. 3(b), after the hand 38 is positioned at the grip position, the movable claws 38a and 38b of the hand 38 are displaced toward each other. The movable claws 38a and 38b are provided with a force sensor 45 (for example, a pressure sensor) that detects a reaction force from the workpiece W (see FIG. 1), and the reaction force detected by the force sensor 45 is transmitted to the host controller 80. When the reaction force detected by the force sensor 45 reaches a reference (a stop reference reaction force described later), the displacement of the movable claws 38a and 38b is stopped, whereby pinching of the workpiece W is completed. As shown in FIG. 3(b) to FIG. 3(c), after the pinching of the workpiece W is completed, the posture of the robot 20 is changed while pinching the workpiece W, whereby the workpiece W is transported to the case C. As shown in FIG. 3(c) to FIG. 3(d), after the workpiece W is accommodated in the case C, the movable claws 38a and 38b are displaced (returned) to the initial position to release the workpiece W. Then, the robot 20 returns to a standby position.

Figure 4:
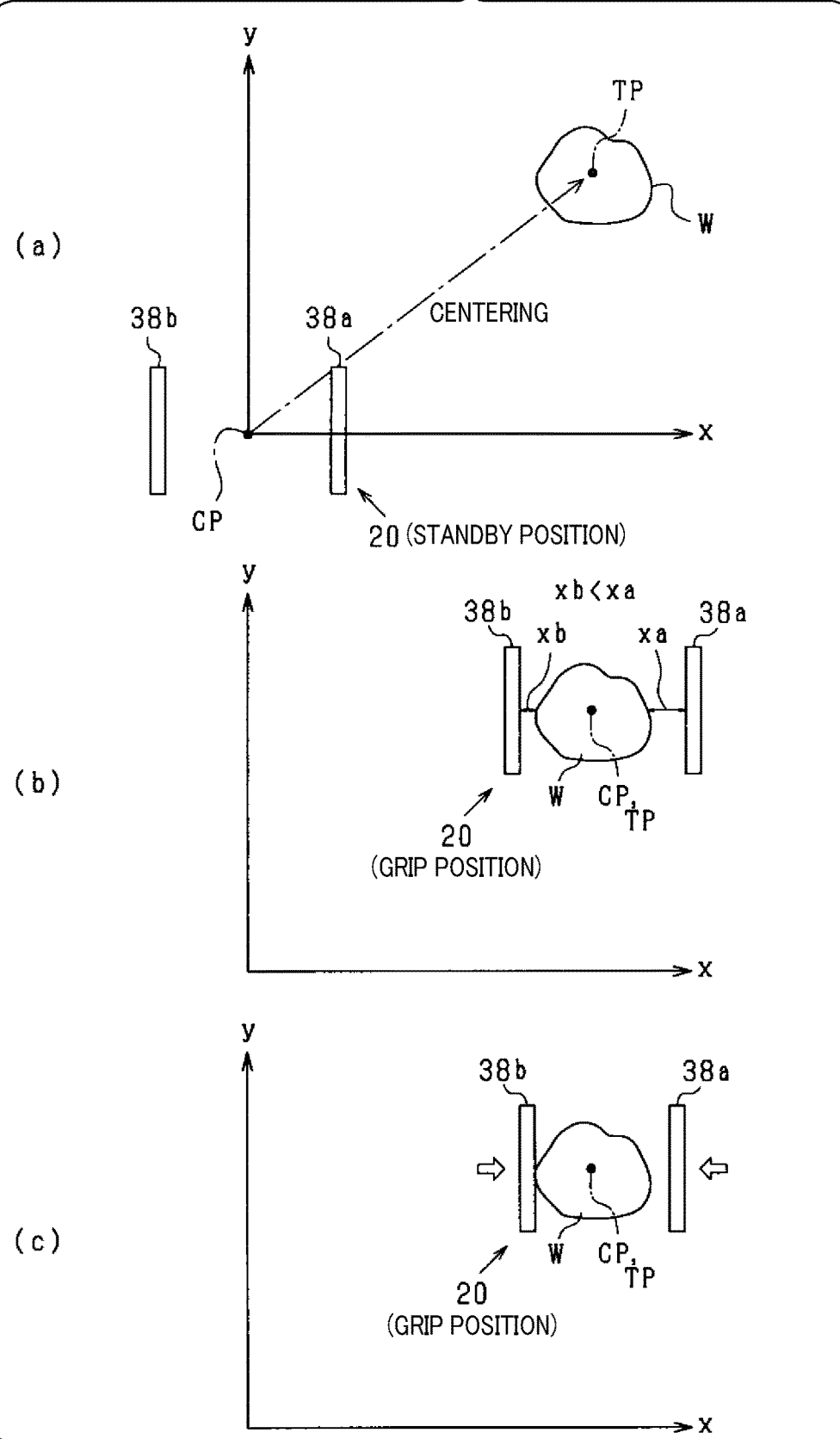
FIG. 4 is a schematic diagram showing a flow of positioning a hand to a grip position.

Here, with reference to FIG. 4, a flow of positioning the hand 38 to a grip position will be described in detail. A predetermined area is imaged at the timing when a new workpiece W is supplied to a predetermined area. This image data is transmitted to the host controller 80, which in turn extracts the outer shape of the workpiece W based on the acquired image data. From the extracted outer shape, the host controller 80 sets a virtual center (temporary center) of the workpiece W as a target position TP, which is one of the target positions described above. Then, the host controller 80 sets the operation mode (various control points) of the robot 20 so that a reference point CP, which is a robot-side reference for positioning the hand 38, matches the target position TP. The operation mode thus set is transmitted to the motion controller 60. The motion controller 60 determines a movement trajectory of the robot 20 based on the operation mode and the current posture of the robot 20.

The opposed surfaces of the movable claws 38a and 38b which face each other have a flat shape perpendicular to the open/close direction of the movable claws 38a and 38b, and the reference point CP is defined as a position equidistant from both the movable claws 38a and 38b (opposed surfaces).

The workpieces W assumed in the present embodiment are food products such as cream puffs or eclairs, which have large variations in shape compared with industrial products. Accordingly, a distance from the reference point CP to the outer surface of the workpiece W may also vary. Therefore, even when the posture of the robot 20 is changed to match the reference point CP and the target position TP to thereby position the hand 38 to a grip position in which the workpiece W comes to a position between the movable claws 38a and 38b, a distance Xa from the movable claw 38a to the workpiece W and a distance Xb from the movable claw 38b to the workpiece W are not always equal to each other.

In the example shown in FIG. 4(b), the hand 38 is biased such that the distance Xb from the movable claw 38b to the workpiece W is shorter than the distance Xa from the movable claw 38a and the workpiece W. When the movable claws 38a and 38b are displaced toward each other, the timing at which the movable claw 38a comes into contact with the workpiece W is different from the timing at which the movable claw 38b comes into contact with the workpiece W. Specifically, as shown in FIG. 4(c), the movable claw 38b comes into contact with the workpiece W before the movable claw 38a comes into contact with the workpiece W.

Since the reaction force of the workpiece W is small, the workpiece W is expected to largely deform when the movable claw 38b comes into contact with the workpiece W, or the workpiece W is expected to slide on a placement surface of the conveyor S1 toward the movable claw 38a when pushed by the movable claw 38b. Such events may cause damage (including excessive deformation) to the workpiece W. This leads to a decrease in yield in production process, and may hinder efforts to improve the production efficiency by the robot system 10. One of the features of the present embodiment is elimination of such concerns by appropriate gripping of the workpiece W performed by machine learning. With reference to FIGS. 5 and 6, characteristic configurations in the present embodiment will be described. FIG. 5 is a function block diagram showing the functions of the main controller 70, and FIG. 6 is a schematic diagram showing input data input to the machine learning device 90.

The host controller 80 includes a control unit 84 that executes control programs stored in the memory 82, and a data acquisition unit 85 that acquires various data from the robot 20 and the camera 65. The data acquisition unit 85 is functionally realized by processing executed by the control unit 84, in a cooperative manner with devises of the robot 20. Hence, the data acquisition unit 85 functionally includes an image data acquisition unit 86 that acquires images of the predetermined area from the camera 65, a posture data acquisition unit 87 that acquires posture data indicating a posture of the robot 20 (for example, a posture before gripping operation or a posture when gripping the workpiece W) from the encoder 42, a distance data acquisition unit 88 that acquires distance data indicating a distance between the workpiece W and each of the movable claws 38a and 38b in a state in which the hand 38 is positioned at the grip position (before adjustment, which will be described later) from the distance sensor 46 (see FIG. 1) provided on each of the movable claws 38a and 38b, and a reaction force data acquisition unit 89 that acquires reaction force data indicating a reaction force applied from the workpiece W when the workpiece W is gripped by the hand 38 from the force sensor 45.

The control unit 84 specifies a position (target position TP) at which the workpiece W is positioned in the predetermined area from the image data acquired by the image data acquisition unit 86, and stores the position in the memory 82 as workpiece position data. Further, the control unit 84 extracts a shape of the workpiece W before gripping operation from the image data acquired before gripping operation, and stores the extracted shape in the memory 82 as shape data. The control unit 84 further extracts a shape of the workpiece W after gripping operation (after release) from the image data acquired after gripping operation (after release), and stores the extracted shape in the memory 82 as shape data. The timing of acquiring image data after gripping operation is a timing at which a predetermined period of time has elapsed after the workpiece W is released (for example, a period of time after which the workpiece W is expected to recover its shape by itself). The predetermined period of time may also be estimated by machine learning.

Further, the control unit 84 specifies the type of the workpiece W (cream puff, eclair, etc.) from the shape data before gripping operation, and stores the specified type in the memory 82 as type data. The host controller 80 controls the robot 20 using a part of these data, and provides a part of such data to the machine learning device 90 as input data. The input data provided to the machine learning device 90 is roughly classified into state data and label data.

The machine learning device 90 includes a state observation unit 97 that acquires various state data from the host controller 80, such as workpiece position data, posture data when gripping the workpiece W (a state in which the workpiece W is positioned at the grip position), shape data before and after gripping operation, and type data. These data are stored in a data storage unit 95 in a learning unit 94. Further, the state observation unit 97 compares the shape data before gripping operation and the shape data after gripping operation (after release) by template matching to calculate the deformation amount (damage) of the workpiece W caused by the gripping operation. The data (comparison data) indicating the deformation amount are also stored in the data storage unit 95 of the learning unit 94. In the present embodiment, the machine learning device 90 is configured to calculate and store the comparison data, but the present invention is not limited thereto. The comparison data may also be provided (input) to the machine learning device 90 by the user. Further, the machine learning device 90 includes a label data acquisition unit 98 that acquires various label data from the host controller 80. The label data acquisition unit 98 acquires stop reference data indicating the reference reaction force set as the stop reference and the above distance data, and stores them in the data storage unit 95.

The various input data that are input to the machine learning device 90 may not necessarily be acquired from the host controller 80. For example, the input data may be directly input from the robot 20 or the camera 65 rather than from the host controller 80.

The learning unit 94 of the machine learning device 90 performs learning by associating the various state data and the label data, and a model (operation setting model) representing the correlation between the state data and the label data is constructed by the learning. The operation setting model is stored in the learning model storage unit 96 of the learning unit 94, and updated based on the newly acquired input data. The updating of the operation setting model is repeated whereby the stop reference reaction force and the position adjustment reference distance at which the workpiece W is likely to be successfully gripped (transported) while reducing the damage (deformation amount) of the workpiece W are learned according to the situation. Then, when the learning has progressed and a large number of data has been reflected to the operation setting model, use of the operation setting model is permitted.

The result output unit 99 of the machine learning device 90 presents an estimated result of an appropriate stop reference reaction force based on the operation setting model permitted to be used and the data for controlling the operation of the robot 20 (workpiece position data, posture data before gripping operation, shape data before gripping operation, and type data) to the host controller 80, or presents an appropriate position adjustment reference distance based on the operation setting model permitted to be used and the data for controlling the operation of the robot 20 (workpiece position data, posture data when gripping the workpiece W, shape data before gripping operation, and type data) to the host controller 80. The appropriate stop reference reaction force described herein refers to an estimated minimum value capable of gripping the workpiece W and minimizing damage (deformation amount) of the workpiece W due to the gripping operation. The appropriate position adjustment reference distance described herein refers to an estimated value of difference between distances between the workpiece W and each of the movable claws 38a and 38b at which the influence (damage) of the difference in contact timing becomes 0 or substantially 0.

In the present embodiment, various input data for successful gripping of the workpiece W are stored in the data storage unit 95, whereas various input data for failed gripping of the workpiece W are deleted without being stored in the data storage unit 95.

The machine learning device 90 described in detail above uses a supervised learning as an algorithm for learning executed by the learning unit 94. The supervised learning is a method of learning a model for estimating an execution result for a new execution condition by identifying features that imply a correlation between the execution condition and the execution result from a known data set (teacher data) of the execution condition and the corresponding execution result.

In the supervised learning, a neural network is used to construct an operation setting model. With reference to FIG. 7, an outline of the neural network will be described. FIG. 7 illustrates a three-layer neural network having four types of input data and three types of output data for the sake of convenience, but the number of input data, the number of output data and the number of intermediate layers are not limited to this example.

A neural network is an aggregation of a large number of nodes N. Each node N is connected to a plurality of other nodes N, and a weight w is set between the connected nodes N. The aggregate of nodes is roughly divided into an aggregate (nodes N11 to N14) that functions as an input layer D1 receiving input of various input data, an aggregate (nodes N21 to N23) that functions as an intermediate layer D2 performing calculation using a weight w2, and an aggregate (nodes N31 to N33) that functions as an output layer D3 outputting output data. The number of nodes in the input layer D1 is set according to the type of the input data x, and the number of nodes in the output layer D3 is set according to the type of the output data y.

In the machine learning device 90 of the present embodiment, the learning unit 94 performs calculation of a multi-layer structure according to the neural network by using, as input data x, the workpiece position data, posture data before gripping operation, posture data when gripping the workpiece W, shape data before gripping operation, type data, comparison data, stop reference data and distance data, to estimate appropriate stop reference reaction force and position adjustment reference distance as an appropriate output data y. The operation mode of the neural network includes a learning mode for performing the above learning and a value prediction mode. For example, the weight w can be learned in the learning mode, and the value of the action can be determined in the value prediction mode using the learned weight w.

Figure 8:
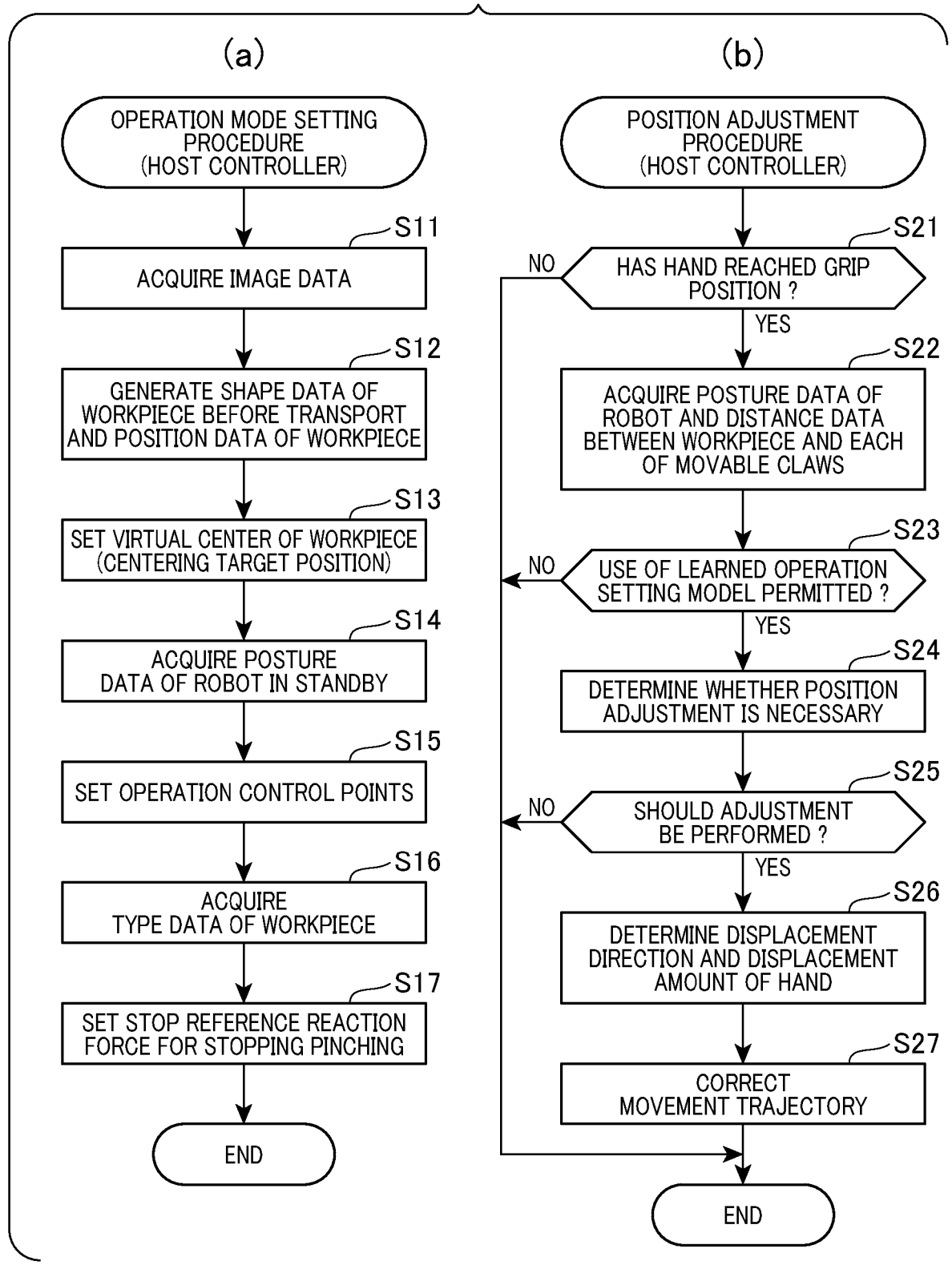
FIG. 8 shows flowcharts executed in the embodiment, in which FIG. 8 includes, in its part (a), a flowchart showing an operation mode setting procedure executed by a CPU of a host controller and, in its part (b), a flowchart showing a position adjustment procedure executed by a CPU of a host controller.

Next, with reference to FIG. 8, an operation mode setting procedure and a position adjustment procedure that are periodically executed by the CPU 81 in the host controller 80 will be described.

In the operation mode setting procedure, first, image data is acquired from the camera 65 (step S11), and shape data of the workpiece W before gripping operation is generated (extracted) from the acquired image data (step S12). Next, position data of the workpiece W, that is, a target position TP is set from the shape data (step S13). Then, posture data of the robot 20 in standby (before positioning operation) is acquired (step S14), and a control point for generating a movement trajectory is set based on the target position TP and the posture data (step S15). Then, type data indicating the type of the workpiece W identified from the image data is acquired (step S16), and a stop reference reaction force is set based on the type data (step S17). In step S17, the stop reference reaction force is determined based on an operation setting model when use of the operation setting model is permitted, and the stop reference reaction force is determined (selected) from a preset candidate range when use of an operation setting model is not permitted.

In the position adjustment procedure, first, whether it is the timing at which the hand 38 is positioned at the grip position or not is determined (step S21). When it is not the timing at which the hand 38 is positioned at the grip position, the position adjustment procedure ends. When the hand 38 is positioned at the grip position, posture data indicating the posture of the robot 20 and distance data indicating the distances between the workpiece W and each of the movable claws 38a and 38b are acquired (step S22). Then, it is determined whether use of the operation setting model is permitted (step S23). If use of the operation setting model is not permitted, the position adjustment procedure ends. That is, if use of the operation setting model is not permitted, position adjustment is not performed. If use of the operation setting model is permitted, it is determined whether position adjustment is necessary (step S24). If the current difference in distance does not exceed the position adjustment reference distance, it is determined that position adjustment should not be performed (step S25: NO), and the position adjustment procedure ends. If the current difference in distance exceeds the position adjustment reference distance, it is determined that position adjustment should be performed (step S25: YES), and the details of position adjustment are determined (step S26). Specifically, the displacement direction and the displacement amount of the hand 38 for adjusting the position of the hand 38 so that the difference between distances between the workpiece W and each of the movable claws 38a and 38b becomes 0 are determined. Based on the determined direction and displacement amount, a movement trajectory correcting procedure is executed. Specifically, each control point is reset in order to correct the movement trajectory of the robot 20 to the movement trajectory determined based on the position adjustment. The reset control point is transmitted to the motion controller 60.

Figure 9:
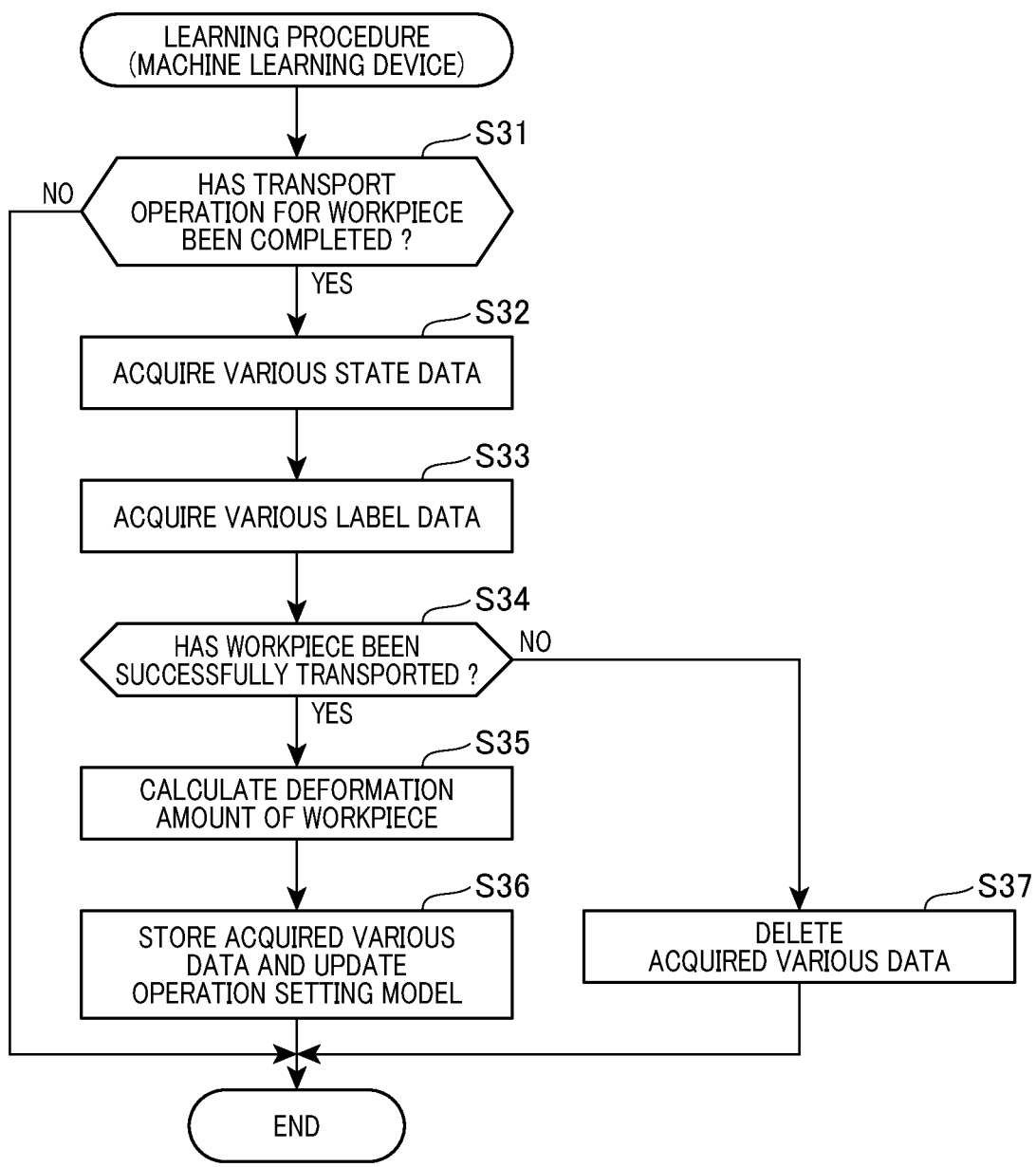
FIG. 9 is a flowchart showing a learning procedure executed by a CPU of a machine learning device.

Next, with reference to the flowchart in FIG. 9, a learning procedure periodically executed by the CPU 91 in the machine learning device 90 will be described.

In the learning procedure, first, whether it is the timing at which the entire operation for transporting the workpiece W into the case C is completed and the robot 20 returns to the standby posture is determined (step S31). When it is not the above timing, the learning procedure ends. When it is the above timing, various state data are acquired from the host controller 80 (step S32). Specifically, the workpiece position data, posture data before gripping operation, posture data when gripping the workpiece W, shape data before gripping operation, type data and image data of the predetermined area after gripping operation are acquired. Then, various label data are acquired from the host controller 80 (step S33). Specifically, the stop reference data and the distance data are acquired.

Subsequently, the image of the predetermined area after gripping operation is analyzed to determine whether the workpiece W is left in the predetermined area, that is, whether the workpiece W has been successfully transported (gripped) (step S34). When the transport of the workpiece W has failed, the acquired various input data are deleted without being stored in the data storage unit 95, that is, without being used as the input data for machine learning, and the learning procedure ends.

On the other hand, when the workpiece W has been successfully transported (gripped), the deformation amount of the workpiece W is calculated. Specifically, the shape data of the workpiece W before gripping operation is compared with the shape data of the workpiece W after gripping operation (after release), and the deformation amount (damage) of the workpiece W is calculated to generate comparison data (step S35). Then, the workpiece position data, posture data, shape data, type data, comparison data, stop reference data and distance data are stored in the data storage unit 95, and the operation setting model is updated based on the newly acquired data. Thereafter, the data are accumulated at least until the above-mentioned use is permitted, and the update of the operation setting model is repeated. The operation setting model is not necessarily updated each time new data is acquired, and the operation setting model may be updated (constructed) when the amount of accumulated data reaches a reference amount.

According to the first embodiment described in detail above, the following advantageous effects can be achieved.

According to the present embodiment, machine learning using various input data including the stop reference data, the distance data and the comparison data is performed to construct an operation setting model used for setting an operation mode of the operation (position adjustment operation and gripping operation) of the robot 20. With this configuration, it is possible not only to set an appropriate stop reference for the movable claws 38a and 38b, but also to appropriately adjust the position of the hand 38 according to the positioning situation of the hand 38. That is, it is possible to prevent the workpiece W from being damaged due to a difference between timings at which each of the movable claws 38a and 38b comes into contact with the workpiece W, contributing to realization of a robot system capable of appropriately gripping the workpiece W having a low reaction force and an irregular shape.

When the workpiece W having a low reaction force is damaged, a change in weight or a change in shape occurs. Since a change in weight mostly occurs along with a change in shape, the degree of damage to the workpiece W can be appropriately reflected in machine learning by comparing the shape of the workpiece W before and after the gripping operation.

In order to improve the convenience of the robot system 10, a certain allowable range (the predetermined area) for the position of the supplied workpiece W can be provided. When such a range is provided, how each of the movable claws 38a and 38b comes into contact with the workpiece W when gripping the workpiece W may differ from each other depending on the position in the range to which the workpiece W is supplied. Further, how each of the movable claws 38a and 38b comes into contact with the workpiece W may differ from each other depending on the posture of the robot 20 when gripping the workpiece W. Therefore, machine learning can be performed while adding workpiece position data indicating the position of the workpiece W and posture data indicating the posture of the robot 20 to the input data, which contributes to realization of a robot system capable of appropriately gripping the workpiece W having a low reaction force and an irregular shape.

Second Embodiment

While the first embodiment describes the example configuration in which an operation setting model is constructed by supervised learning, the learning method for constructing an operation setting model may also be reinforcement learning.

When an operation setting model is constructed by reinforcement learning, the reward may be increased if the difference between the shape of the workpiece W before gripping operation and the shape of the workpiece W after gripping operation (after release) is within the reference amount (in the present embodiment, 5%), and the reward may be decreased if the difference exceeds the reference amount. In the second embodiment, only the data for successful gripping of the workpiece W are used as input data for learning. However, a reward may also be set for the success or failure of gripping, and the data for failed gripping may also be used as input data. In this case, for example, the reward may be increased for successful gripping of the workpiece W, and may be decreased for failed gripping of the workpiece W. The reward for successful gripping of the workpiece W may be set to be larger than the reward given when the difference in shape is within the reference amount to thereby realize a configuration in which success of gripping is a priority.

When the above position adjustment is performed, the transport efficiency is slightly lowered compared with the case where the position adjustment is not performed. Further, when the position adjustment is performed, the transport efficiency decreases as the displacement amount of the hand 38 increases. Therefore, a reward for transport efficiency may be set by applying reinforcement learning to thereby achieve both the protection of the workpiece W and the improvement in transport efficiency. For example, when the position adjustment is performed, the reward may be increased as the displacement amount of the hand 38 decreases and the reward may be decreased as the displacement amount of the hand 38 increases to thereby minimize the displacement amount of the hand 38 even when the position adjustment is necessary. Alternatively, it is also possible to add the data of required time from the start to the end of the operation of the robot 20 as input data, and the reward may be increased as the required time decreases, and the reward may be decreased as the required time increases.

Third Embodiment

In the above embodiments such as the first embodiment, the movable claws 38a and 38b are stopped when the reaction force detected by the force sensor 45 reaches the stop reference. In this case, the smaller the reaction force of the workpiece W, the more difficult it is to detect the reaction force. Therefore, for the workpiece W having an extremely small reaction force, the reference for stopping the movable claws 38a and 38b may be a relative distance (interval or width) between the movable claws 38a and 38b, that is, a displacement amount of the movable claws 38a and 38b in the pinching direction, rather than the reaction force.

With this configuration, the reference relative distance as the stop reference may be set based on the various data and an operation setting model when use of the operation setting model is permitted, and the stop reference reaction force is determined (selected) from a preset candidate range when use of an operation setting model is not permitted. Then, during learning, data indicating the relative distance when gripping operation is performed may be used as the stop reference data, and the relative distance may be used as input data for learning.

Fourth Embodiment

Figure 10:
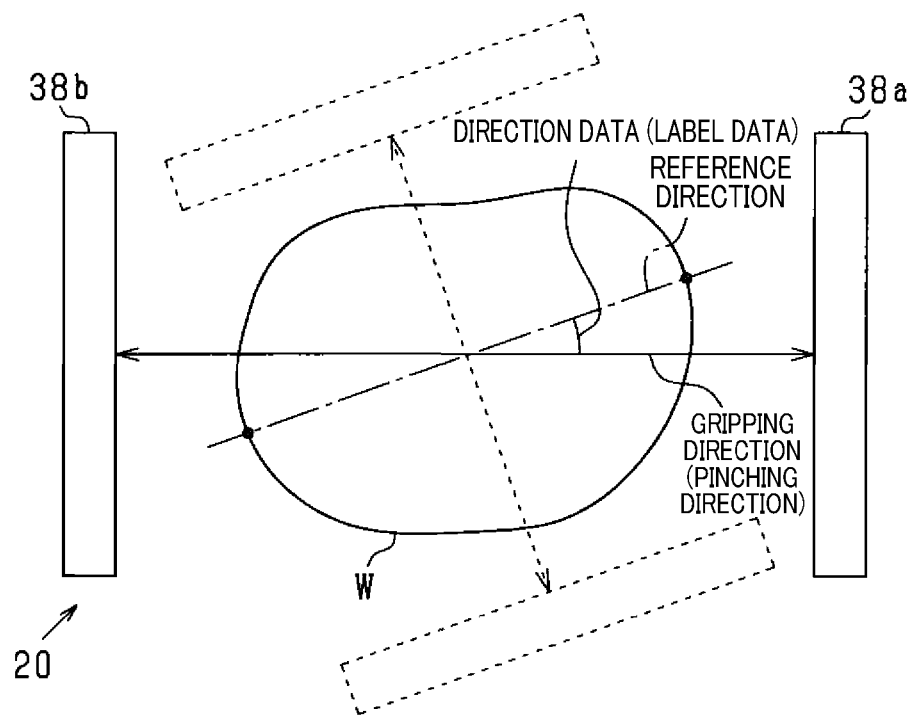
FIG. 10 is a schematic view illustrating input data according to a fourth embodiment.

In the above embodiments such as the first embodiment, the workpiece W (in particular, cream puff or daifuku) has an irregular shape, and there is a possibility that the restoring force of the workpiece W after gripping operation may vary depending on the direction in which the workpiece W is gripped. That is, there is a possibility that the difference in timing and the influence of the load may vary depending on the direction in which the workpiece W is gripped. In other words, the positional relationship or the like which does not require adjustment between the object and each of the movable claws 38a and 38b may vary depending on the pinching direction. In addition, the deformation amount (damage) may be smaller when the workpiece W is pinched in a certain direction compared with a case where the workpiece W is pinched in another direction. In consideration of such circumstances, one of the features of the present embodiment is pinching direction data indicating the pinching direction being added to the input data. With reference to FIG. 10, the input data will be described below. The pinching direction refers to a direction in which the movable claws 38a and 38b are displaced in gripping operation.

An image of the workpiece W positioned in the predetermined area is input from the camera 65 to the host controller 80. The host controller 80 sets the reference direction of the workpiece W by referring to the shape data indicating the outer shape of the workpiece W generated (extracted) from the captured image. Specifically, two points on the outline whose distance therebetween is the largest are determined, and the direction of a straight line connecting these two points is set as a reference direction. During learning, pinching direction data is acquired as data indicating the relationship of the pinching direction and the reference direction. Specifically, the pinching direction data is data indicating the angle of the pinching direction relative to the reference direction. By adding the pinching direction to the input data, the influence of the pinching direction is reflected to the constructed operation setting model. Therefore, when the operation mode is determined based on the direction data and the operation setting model, the stop reference reaction force and the position adjustment reference distance take into account the pinching direction.

In the present embodiment, two points on the outline whose distance therebetween is the largest are determined, and the direction of a straight line connecting these two points is set as a reference direction. However, instead of this, two points on the outline whose distance therebetween is the smallest may be determined, and the direction of a straight line connecting these two points may also be set as a reference direction.

In the fourth embodiment, the stop reference reaction force and the position adjustment reference distance are set taking into account the pinching direction. However, instead of this, the pinching direction may be set using the various data (shape data of the workpiece W) and an operation setting model when use of the operation setting model is permitted. That is, the orientation of the hand 38 may be set to the pinching direction in which the stop reference reaction force is small and the position adjustment reference distance is large.

Fifth Embodiment

Figure 11:
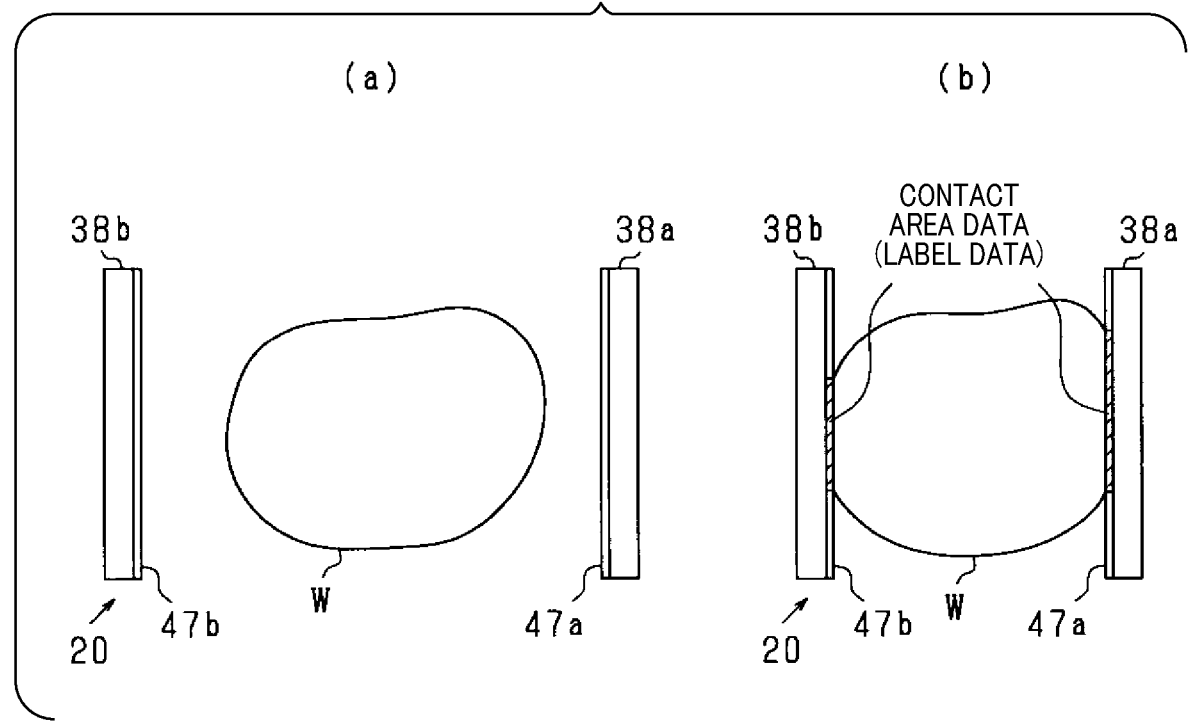
FIG. 11 is a schematic view illustrating input data according to a fifth embodiment.

In the above embodiments such as the first embodiment, the workpiece W has a large variation in shape and a small reaction force. In gripping of such a workpiece W, the influence on the workpiece W may vary depending on the contact area between the workpiece W and each of the movable claws 38a and 38b. In other words, the positional relationship or the like which does not require adjustment between the workpiece W and each of the movable claws 38a and 38b may vary depending on the contact area. Further, the deformation amount (damage) of the workpiece W may be reduced depending on the size of the contact area. In consideration of such circumstances, one of the features of the present embodiment is contact area data indicating the contact area being added to the input data. With reference to FIG. 11, the input data will be described below.

The opposed surfaces of the movable claws 38a and 38b are provided with sheet-shaped contact sensors 47a and 47b, respectively. The detection results from the contact sensors 47a and 47b are transmitted to the host controller 80, and the host controller 80 specifies the contact area between the workpiece W and each of the movable claws 38a and 38b based on the detection results. When the workpiece W is pinched with the same strength on both sides, a local load on the workpiece W can be reduced as the contact area increases. That is, the larger the contact area, the more suitably the workpiece W can be protected.

The contact area data indicating the contact area is supplied to the machine learning device 90, and the machine learning device 90 stores the contact area data as input data in the data storage unit 95, and constructs an operation setting model using the contact area data. By specifying the relationship between the shape of the workpiece W and the contact area by machine learning, the contact area is estimated from the operation setting model and the shape of the workpiece W, and the stop reference reaction force and the position adjustment reference distance can be set based on the estimated contact area.

In the fifth embodiment, the stop reference reaction force and the position adjustment reference distance are set taking into account the estimated contact area. However, instead of this, the pinching direction in which the contact area becomes appropriate (see the fourth embodiment) may be set using the various data (shape data of the workpiece W) and an operation setting model when use of the operation setting model is permitted. That is, the orientation of the hand 38 may be set to the pinching direction in which the stop reference reaction force is small and the position adjustment reference distance is large.

OTHER EMBODIMENTS

The present invention is not limited to the description in the above embodiments, and may also be implemented as follows, for example. Each of the configurations described below may be individually applied to the above embodiments, or a part or the entirety of the configurations may be combined and applied to the above embodiments. Further, all or part of the various configurations described in the above embodiments may also be combined in any manner.

In this case, it is preferred to guarantee the technical significance (effects to be exhibited) of each configuration to be combined.

It is also possible to separately construct the operation setting model described in the above embodiments as a model for position adjustment (position adjustment model) and a model for stop reference setting (grip model).

In the above embodiments, the gripping operation and the position adjustment operation, which are part of the operation of the robot 20, are set as "predetermined operations," and a model for setting the predetermined operations is constructed by machine learning. However, this configuration can be changed, and a model for setting the entire operation of the robot 20 including the positioning operation of the hand 38, the position adjustment operation of the hand 38 and the gripping operation of the workpiece W can also be constructed by machine learning.

In the above embodiments, the robot system 10 is configured to monitor the success or failure of gripping the workpiece W and the degree of damage, but the present invention is not limited thereto. For example, the operator may monitor the success or failure of gripping and the degree of damage, and input the monitoring result to the machine learning device 90.

Environmental data (temperature data or humidity data) indicating the environment around the robot 20 may be added to the input data for learning. The hardness of an object to be gripped, such as a cream puff, having a low reaction force and an irregular shape may change according to the environmental conditions such as temperature and humidity. In other words, the positional relationship or the like which does not require adjustment between the object to be gripped and each of the movable claws 38a and 38b may vary depending on the environmental conditions. Therefore, as shown in the modified example, machine learning performed while adding the environmental data to the various input data described in the above embodiments can further optimize the position adjustment operation and the gripping operation.

In the above embodiments, the displacement speed of the movable claws 38a and 38b when gripping operation is performed is set to be constant, but the present invention is not limited thereto. With the displacement speed as a variable parameter, speed data indicating the displacement speed when the workpiece W is gripped may be added to the input data for learning. When the above-mentioned difference in timing occurs, the influence on the object to be gripped may vary depending on the displacement speed of the movable claws 38a and 38b. In other words, the positional relationship or the like which does not require adjustment between the object and each of the movable claws 38a and 38b may vary depending on the displacement speed. Therefore, as shown in the modified example, machine learning performed while adding the speed data to the various input data described in the above embodiments can further optimize the gripping operation.

A configuration may be added in which a target point setting model used for setting the target position TP is constructed by machine learning based on shape data indicating the shape of the workpiece W before gripping operation, workpiece position data indicating the set target position TP, and distance data indicating the distance between each of the movable claws 38a and 38b and the workpiece W when the hand 38 is positioned at the grip position. As the setting accuracy of the target position TP increases, the necessity of the above position adjustment can be reduced, contributing to improvement in transport efficiency.

In the above embodiments, the position adjustment is performed by displacing the grip unit, but the present invention is not limited thereto. For example, one of the movable claws with larger distance to the workpiece W may be displaced toward the workpiece W for adjusting the distance, or one of the movable claws with smaller distance to the workpiece W may be displaced farther from the workpiece W for adjusting the distance. However, in such a configuration, the workpiece W may be gripped at a position biased toward one of the movable claws. This is not preferred from the viewpoint of stabilization of the gripping function and improvement in efficiency of the positioning operation to the case C. That is, as described in the above embodiments, there is a technical significance in the configuration in which the position adjustment is performed by displacing the hand 38, rather than the movable claws 38a and 38b.

In the above embodiments, the amount of change in shape (damage) of the workpiece W is specified by comparing the shape data of the workpiece W before gripping operation with the shape data of the workpiece W after gripping operation, but the present invention is not limited thereto. Alternatively, or in addition to this configuration, the weight of workpiece W may be monitored by using a weight sensor or the like, and the amount of change in weight of the workpiece W may be specified by comparing the weight of the workpiece W before gripping operation with the weight of the workpiece W after gripping operation. That is, the comparison data which is input data to the machine learning device 90 may also be data indicating a weight difference.

In the above embodiments, the camera 65 is fixed to the ceiling of the factory. However, the camera 65 may also be attached to, for example, the robot main body 30 (for example, an arm).

In the above embodiments, the workpiece W is gripped by two movable claws 38a and 38b. However, the number of movable claws is not specifically limited. For example, the number of movable claws may be three or four.

In the above embodiments, the main controller 70 includes the host controller 80 and the machine learning device 90. However, the host controller 80 and the machine learning device 90 may be separately provided. Further, a configuration corresponding to the machine learning device 90 may be provided on the cloud.

In the above embodiments, cream puffs and eclairs are exemplified as objects to be gripped by the robot 20, but the present invention is not limited thereto. Other food products having a small reaction force and a large variation in shape, such as daifuku and bread, may also be objects to be gripped by the robot 20. Further, objects to be gripped are not limited to processed foods. The objects to be gripped may also be fruits and vegetables, such as mandarin oranges and tomatoes, and such objects can also be suitably protected.

What is claimed is:

1. A robot system comprising:
a robot having a grip unit composed of a single pair of movable claws, the robot being configured to hold an object by gripping the object with the movable claws, the object being soft so as to be varied in shape when the object has been gripped by the pair of movable claws; and
a controller that is configured to control the robot to perform (i) a positioning operation, which is for positioning the grip unit to a predetermined position in which the object is located between the pair of movable claws, and (ii) a gripping operation for displacing each of the movable claws toward each other at the predetermined position, the controller being configured to stop the displacement of the pair of movable claws when a reaction force from the object becomes a reference value during the gripping operation or when a distance between each movable claw of the pair of movable claws and the object becomes a reference value during the gripping operation of the pair of movable claws, wherein
the robot system is configured to perform an adjustment operation for adjusting positions of the pair of movable claws relative to the object by displacing the grip unit in a situation where the grip unit is positioned in the predetermined position,
the reference value for stopping the gripping operation is a variable value,
the robot system includes a model construction unit that (i) acquires stop reference data indicating the reference value set for gripping of the object, distance data indicating a distance between each of the movable claws of the grip unit positioned at the predetermined position and the object, and comparison data indicating a deformation amount caused by a difference between a shape of the object provided before the gripping operation is performed and a shape of the object provided after the gripping operation has been performed, and (ii) performs machine learning using the stop reference data, the distance data and the comparison data to construct a model used for setting an operation mode of a predetermined operation including the adjustment operation and the gripping operation, and
the controller includes:
an acquisition unit that acquires the distance data indicating a distance between the object and each of the movable claws of the grip unit when the grip unit is positioned at the predetermined position; and
a setting unit that sets an operation mode of the predetermined operation of the robot, the setting unit being configured to set the operation mode of the predetermined operation based on the distance data acquired by the acquisition unit and the model constructed by the model construction unit.

2. The robot system according to claim 1, wherein
the model construction unit is configured to acquire shape data indicating the shape of the object before the gripping operation is performed and direction data indicating a relationship between a reference direction of the object and a direction in which the pair of movable claws pinch the object, and perform the machine learning by associating the stop reference data, the distance data, the comparison data, the shape data and the direction data.

3. The robot system according to claim 1, wherein
a portion of the pair of movable claws which comes into contact with the object has a flat surface, and
the model construction unit is configured to acquire shape data indicating the shape of the object before the gripping operation is performed and contact area data indicating a contact area between the object and the pair of movable claws when gripping the object, and perform the machine learning by associating the stop reference data, the distance data, the comparison data, the shape data and the contact area data.

4. The robot system according to claim 1, wherein the controller is configured to displace the pair of movable claws at a set speed when the gripping operation is performed,
the speed is a variable value, and
the model construction unit is configured to acquire speed data indicating a displacement speed when each of the movable claws are displaced toward the object, and perform the machine learning by associating the stop reference data, the distance data, the comparison data and the speed data.

5. The robot system according to claim 1, wherein the model construction unit is configured to acquire position data indicating a position of the object before the gripping operation is performed, and perform the machine learning by associating the stop reference data, the distance data, the comparison data and the position data.

6. The robot system according to claim 1, wherein the model construction unit is configured to acquire posture data indicating a posture of the robot when gripping the object, and perform the machine learning by associating the stop reference data, the distance data, the comparison data and the posture data.

7. The robot system according to claim 1, wherein the model construction unit is configured to acquire environmental data indicating an environment around the robot, and perform the machine learning by associating the stop reference data, the distance data, the comparison data and the environmental data.

8. The robot system according to claim 1, wherein the setting unit is configured to set an operation mode to grip the object without adjusting relative positions between the pair of movable claws and the object when the distance data acquired by the acquisition unit is data indicating a distance within a range defined by the model, and the setting unit is configured to further set an operation mode to grip the object after adjusting relative positions between the pair of movable claws and the object when the distance data acquired by the acquisition unit is data indicating a distance out of a range defined by the model.

9. A robot system comprising:
a robot having a grip unit composed of a single pair of movable claws, the robot being configured to hold an object by gripping the object with the movable claws, the object being soft so as to be varied in shape when the object has been gripped by the pair of movable claws; and
a controller configured to control the robot to perform (i) a positioning operation, which is for positioning the grip unit to a predetermined position in which the object is located between the pair of movable claws, and (ii) a gripping operation for displacing each of the movable claws toward each other at the predetermined position, wherein
the robot system is configured to adjust positions of the pair of movable claws relative to the object by displacing the grip unit in a situation where the grip unit is positioned in the predetermined position, the robot system includes a model construction unit configured to (i) acquire distance data, which indicates a distance between each movable claw of the pair of movable claws of the grip unit positioned at the predetermined position and the object during the gripping operation of the pair of movable claws, and comparison data indicating a deformation amount caused by a difference between a shape of the object provided before the gripping operation is performed and a shape of the object provided after the gripping operation has been performed, and (ii) perform machine learning using the distance data and the comparison data to construct a model used for setting a position adjustment mode of the grip unit at the predetermined position, and the controller includes:
an acquisition unit configured to acquire the distance data indicating a distance between the object and each of the movable claws of the grip unit when the grip unit is positioned at the predetermined position; and
a setting unit configured to set the position adjustment mode based on the distance data acquired by the acquisition unit and the model constructed by the model construction unit.

10. The robot system according to claim 9, wherein the model construction unit is configured to acquire shape data indicating the shape of the object before the gripping operation is performed and direction data indicating a relationship between a reference direction of the object and a direction in which the pair of movable claws pinch the object, and perform the machine learning by associating the stop reference data, the distance data, the comparison data, the shape data and the direction data.

11. A machine learning device installed in a robot system comprising:
a robot having a grip unit composed of a pair of movable claws, the robot being configured to hold an object by pinching the object with the movable claws, the object being soft so as to be varied in shape when the object has been gripped by the pair of movable claws; and
a controller configured to control the robot to perform (i) a positioning operation, which is for positioning the grip unit to a predetermined position in which the object is located between the pair of movable claws, and (ii) a gripping operation for displacing each of the movable claws toward each other at the predetermined position, the controller being configured to stop the displacement of the pair of movable claws when a reaction force from the object becomes a reference value during the gripping operation or when a distance between each movable claw of the pair of movable claws and the object becomes a reference value during the gripping operation of the pair of movable claws, and being applied to the robot system configured to perform an adjustment operation for adjusting positions of the pair of movable claws relative to the object by displacing the grip unit in a situation where the grip unit is positioned in the predetermined position, wherein
the reference value for stopping the gripping operation is a variable value, and
the machine learning device includes a model construction unit configured to (i) acquire stop reference data indicating the reference value set for gripping of the object, distance data indicating a distance between each of the movable claws of the grip unit positioned at the predetermined position and the object, and comparison data indicating a deformation amount caused by a difference between a shape of the object provided before the gripping operation is performed and a shape of the object provided after the gripping operation has been performed, and (ii) perform machine learning based on the stop reference data, the distance data and the comparison data to construct a model used for setting an operation mode of a predetermined operation including the adjustment operation and the gripping operation.

12. The robot system according to claim 11, wherein the model construction unit is configured to acquire shape data indicating the shape of the object before the gripping operation is performed and direction data indicating a relationship between a reference direction of the object and a direction in which the pair of movable claws pinch the object, and perform the machine learning by associating the stop reference data, the distance data, the comparison data, the shape data and the direction data.

13. The robot system according to claim 11, wherein a portion of the pair of movable claws which comes into contact with the object has a flat surface, and
the model construction unit is configured to acquire shape data indicating the shape of the object before the gripping operation is performed and contact area data indicating a contact area between the object and the pair of movable claws when gripping the object, and perform the machine learning by associating the stop reference data, the distance data, the comparison data, the shape data and the contact area data.

14. The robot system according to claim 11, wherein the controller is configured to displace the pair of movable claws at a set speed when the gripping operation is performed,
the speed is a variable value, and
the model construction unit is configured to acquire speed data indicating a displacement speed when each of the movable claws are displaced toward the object, and perform the machine learning by associating the stop reference data, the distance data, the comparison data and the speed data.

15. The robot system according to claim 11, wherein the model construction unit is configured to acquire position data indicating a position of the object before the gripping operation is performed, and perform the machine learning by associating the stop reference data, the distance data, the comparison data and the position data.

16. The robot system according to claim 11, wherein the model construction unit is configured to acquire posture data indicating a posture of the robot when gripping the object, and perform the machine learning by associating the stop reference data, the distance data, the comparison data and the posture data.

17. The robot system according to claim 11, wherein the model construction unit is configured to acquire environmental data indicating an environment around the robot, and perform the machine learning by associating the stop reference data, the distance data, the comparison data and the environmental data.

* * * * *